United States Patent
Gokarn et al.

(10) Patent No.: US 12,067,500 B2
(45) Date of Patent: Aug. 20, 2024

(54) METHODS FOR PROCESSING A PLURALITY OF CANDIDATE ANNOTATIONS OF A GIVEN INSTANCE OF AN IMAGE, AND FOR LEARNING PARAMETERS OF A COMPUTATIONAL MODEL

(71) Applicant: IDEMIA IDENTITY & SECURITY FRANCE, Courbevoie (FR)

(72) Inventors: Ashutosh Gokarn, Courbevoie (FR); Dora Csillag, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 928 days.

(21) Appl. No.: 17/112,504

(22) Filed: Dec. 4, 2020

(65) Prior Publication Data

US 2021/0174228 A1 Jun. 10, 2021

(30) Foreign Application Priority Data

Dec. 6, 2019 (EP) .................................... 19306594

(51) Int. Cl.
*G06K 9/00* (2022.01)
*G06F 16/51* (2019.01)
*G06N 5/04* (2023.01)
*G06N 20/00* (2019.01)
*G06V 10/70* (2022.01)

(52) U.S. Cl.
CPC ............... *G06N 5/04* (2013.01); *G06F 16/51* (2019.01); *G06N 20/00* (2019.01); *G06V 10/70* (2022.01)

(58) Field of Classification Search
CPC .......... G06N 5/04; G06N 20/00; G06F 16/51; G06F 16/58; G06F 16/55; G06V 10/70
See application file for complete search history.

(56) References Cited

U.S. PATENT DOCUMENTS 7,890,512 B2 * 2/2011 Mei .................. G06F 16/51
382/224
8,111,873 B2 * 2/2012 Berthilsson ............ G06V 20/52
382/103

(Continued)

OTHER PUBLICATIONS

Anonymous, "Crowdsourcing", Wikipedia, Nov. 20, 2019, pp. 1-12.

(Continued)

*Primary Examiner* — Shervin K Nakhjavan
(74) *Attorney, Agent, or Firm* — WOMBLE BOND DICKINSON (US) LLP

(57) ABSTRACT

The present invention relates to a method for processing a plurality of candidate annotations of a given instance of an image, each candidate annotation being defined as a closed shape matching the instance, characterized in that the method comprises performing, by a processing unit (21) of a server (2), steps of:
(a) segregating said candidate annotations into a set of separate groups of at least overlapping candidate annotations;
(b) selecting a subset of said groups as a function of the number of candidate annotations in each group;
(c) building a final annotation of the given instance of said image as a combination of regions of the candidate annotations of said selected groups where at least a second predetermined number of the candidate annotations of said selected groups overlap.

16 Claims, 4 Drawing Sheets

(56) References Cited

U.S. PATENT DOCUMENTS

| | | | |
|---|---|---|---|
| 8,131,039 B2* | 3/2012 | Krishnapuram | G06F 18/2115 |
| | | | 382/160 |
| 9,245,205 B1* | 1/2016 | Soldevila | G06V 10/464 |
| 9,792,532 B2* | 10/2017 | Cox | G06F 18/2413 |
| 9,972,080 B2 | 5/2018 | Jung | G06F 18/23 |
| 10,007,678 B2 | 6/2018 | Tate | G06F 16/50 |
| 10,026,020 B2 | 7/2018 | Jin | G06V 20/70 |
| 10,390,082 B2 | 8/2019 | Song | H04N 21/8549 |
| 10,769,813 B2* | 9/2020 | Kuehnle | H04N 13/351 |
| 11,238,362 B2* | 2/2022 | Jin | G06N 3/045 |
| 11,238,374 B2* | 2/2022 | Kao | G06T 7/70 |
| 11,715,281 B2* | 8/2023 | Olmeda Reino | G06F 18/2113 |
| | | | 382/156 |
| 2003/0137510 A1* | 7/2003 | Massen | G01C 15/02 |
| | | | 345/420 |
| 2016/0171429 A1* | 6/2016 | Schwartz | G06T 7/90 |
| | | | 382/103 |
| 2017/0309021 A1* | 10/2017 | Barnes | G06T 7/0012 |
| 2018/0181881 A1* | 6/2018 | Du | G06V 10/82 |
| 2018/0295273 A1* | 10/2018 | Li | G06V 10/25 |
| 2019/0304102 A1* | 10/2019 | Chen | G06N 20/00 |
| 2019/0313963 A1 | 10/2019 | Hillen | |
| 2020/0019799 A1* | 1/2020 | Shen | G06V 10/25 |
| 2021/0056663 A1* | 2/2021 | Zhang | G06T 3/0012 |
| 2021/0209398 A1* | 7/2021 | Endo | G06T 7/0012 |
| 2021/0279503 A1* | 9/2021 | Qi | G06F 18/253 |
| 2022/0222952 A1* | 7/2022 | Luo | G06V 10/993 |
| 2022/0335712 A1* | 10/2022 | Yoshida | G06V 10/778 |
| 2023/0127698 A1* | 4/2023 | Dave | G06N 20/00 |
| | | | 382/128 |
| 2023/0252807 A1* | 8/2023 | Schaumberg | G06V 10/454 |
| | | | 382/133 |
| 2023/0343085 A1* | 10/2023 | Inoshita | G06V 10/945 |

OTHER PUBLICATIONS

European Search Report and Search Opinion received for European Application No. 19306594.3, mailed on May 28, 2020, 9 pages.

Office Action received for European Patent Application No. 19306594.3, mailed on Aug. 30, 2023, 11 pages.

* cited by examiner

METHODS FOR PROCESSING A PLURALITY OF CANDIDATE ANNOTATIONS OF A GIVEN INSTANCE OF AN IMAGE, AND FOR LEARNING PARAMETERS OF A COMPUTATIONAL MODEL

FIELD OF THE INVENTION

The field of this invention is that of machine learning and artificial intelligence.

More particularly, the invention relates to a method for processing annotation of objects in images, for generating a training database of images for machine learning.

BACKGROUND OF THE INVENTION

Machine learning algorithms are able to build a computational model performing a given task based on a set of sample data, known as "training database".

In supervised or semi-supervised learning, the set of data contains both the inputs and the desired outputs, which are referred to as "ground truth". During the training, the model shall produce outputs as close as possible to the ground truth.

For image-related tasks (detection, segmentation, classification, etc.) the training database is a set of images/videos with or without target objects (the input), and each image has "annotations" designing the result of the task (the output), sometimes simply a label designating whether it contained a given object, but generally more complex bounding boxes, segmented areas, etc.

It is easy to understand that the quality of a training database, i.e. the accuracy of annotations in case of training images, is essential for reaching the highest sensibility and reliability of the trained model.

However, the process of annotating non-annotated datasets has to be performed manually by humans. Thus, high-quality annotated training databases are usually difficult and expensive to produce because of the large amount of time needed to annotate the images.

Crowdsourcing has emerged as a cost-effective tool to harness the power of human computation to annotate large-scale non-annotated datasets.

A problem is that annotators may come from a diverse pool including experts, novices, spammers and even sometimes malicious annotators. In any case, unintentional errors are common because most crowdsourcing tasks are tedious.

Hence, a fundamental challenge in crowdsourcing applications is how to accurately and efficiently estimate the ground truth from potential noisy annotations provided by a set of heterogeneous annotators. Another challenge comes from the evaluation of annotation reliability since the ground truth is often unknown in practice.

A solution, known as "Multi-label Annotation Aggregation", (see for instance the document *Multi-Label Annotation Aggregation in Crowdsourcing*, Xuan We, Daniel Dajun Zeng, Junming Yin, Jun. 19, 2017) proposes to have several annotators simultaneously work on the same data, so as obtain for each instance a plurality of possible annotations that may be statistically aggregated into one "final" annotation, somehow representing the choice of the majority. Nevertheless, this method implies a very complex Bayesian model with Mixture of Multiple Bernoulli distribution that shall be simplified for practical use.

There is consequently a need for a method for processing man-made annotations of datasets for generating training bases which could be lighter, more efficient and more reliable than known methods.

SUMMARY OF THE INVENTION

For these purposes, the present invention provides according to a first aspect a method for processing a plurality of candidate annotations of a given instance of an image, each candidate annotation being defined as a closed shape matching the instance, characterized in that the method comprises performing, by a processing unit of a server, steps of:
  (a) segregating said candidate annotations into a set of separate groups of at least overlapping candidate annotations;
  (b) selecting a subset of said groups as a function of the number of candidate annotations in each group;
  (c) building a final annotation of the given instance of said image as a combination of regions of the candidate annotations of said selected groups where at least a second predetermined number of the candidate annotations of said selected groups overlap.

According to preferred but non-limiting features:

Step (a) comprises successively, for each candidate annotation, either assigning it to an existing group of candidate annotations or creating a new group.

Two candidate annotations assigned to the same group present a Jaccard index above a predetermined threshold and/or are concentric.

The groups selected at step (b) are the groups containing at least a first predetermined number of the candidate annotations.

The first and the second predetermined number are respectively defined as a first rate of the number of all candidate annotations, and a second rate of the number of candidate annotations of said selected groups.

The closed shape of each candidate annotation is a polygon.

The final annotation of the given instance of said image is the union of all possible combinations of intersections of the second predetermined number of candidate annotations of said selected groups among all the candidate annotations of said selected groups.

The candidate annotations are received from clients of human annotators.

Said image is initially non-annotated, and the method comprises a previous step (a0) of transmitting the non-annotated image to the clients, and receiving in response from each client a candidate annotation for at least one instance of the image, steps (a) to (c) being performed for each instance for which at least one candidate annotation has been received so as to build a final annotation for each instance annotated at least once of said image.

The method comprises a step (d) of storing the image associated with the final annotation in a database.

The method is performed for a plurality of non-annotated images, so as to generate a training database for machine learning.

According to a second aspect, the invention provides a method for learning parameters of a computational model comprising:
  generating a training database using the method according to the first aspect;
  performing a machine learning algorithm on said generated training database.

According to a third and a fourth aspects, the invention provides a computer program product comprising code instructions to execute a method according to the first aspect for processing a plurality of candidate annotations of a given instance of an image, or according to the second aspect for learning parameters of a computational model; and a computer-readable medium, on which is stored a computer program product comprising code instructions for executing a method according to the first aspect for processing a plurality of candidate annotations of a given instance of an image, or according to the second aspect for learning parameters of a computational model.

BRIEF DESCRIPTION OF THE DRAWINGS

The above and other objects, features and advantages of this invention will be apparent in the following detailed description of an illustrative embodiment thereof, which is to be read in connection with the accompanying drawings wherein:

FIG. 3b represents the final annotation that can be built for the plurality of candidate annotations of FIG. 3a.

DETAILED DESCRIPTION OF A PREFERRED EMBODIMENT

Architecture

The present application proposes a method for processing a plurality of candidate annotations of a given instance of an image, advantageously performed for a plurality of instances of a plurality of images, so as to generate a training database for machine learning, and possibly to train a computational model on the training database.

In other words, it is supposed that at least one instance of an image has been independently annotated several times (by different human annotators); so that said plurality of candidate annotations (one per annotator) is available. The aim of the present method is to aggregate, i.e. to "merge" the candidate annotations into a single "final" annotation that is expected to be reliable and accurate and that can be associated as ground truth to the image. Note that the perfect ground truth is unknown so that said aggregation is only performed as a function of the candidate annotations, i.e. said aggregation does not imply analysis of the image.

By instance, it is meant an object of interest of a given type depicted by the image, which is to be recognized/detected/segmented, etc., for instance the type "face", the type "person", the type "vehicle", etc. As an example, if the database is intended for learning face recognition algorithms, the instances to be annotated by annotators are the people's faces visible in the images. Note that each annotation of an instance may be associated to a label identifying a type or a class or the instance.

By annotation of an instance it is meant a tag locating the instance on the image. More precisely, each candidate annotation is defined as a closed shape matching (at least approximately) the instance, i.e. a planar space corresponding to the area of the image depicting said instance. In the following description, will be used the example of polygonal annotations (i.e. said closed shape is a polygon) because they are very general and can be easily defined by a list of coordinates of their successive vertices, but specific shapes (such as rectangles for boxes or ellipses—the shapes not necessarily bounded by segments) or any other figures (regular or irregular) are possible.

It is to be noted that candidate annotations are not expected to perfectly match the instance because of human errors, in other words it is supposed that each annotator tries his/her best to fit the instance, but some candidate annotations are likely to either be too tight (i.e. parts of the instance are left outside the closed shape) or too loose (the closed shape could be closer to the instance).

Figure 1:
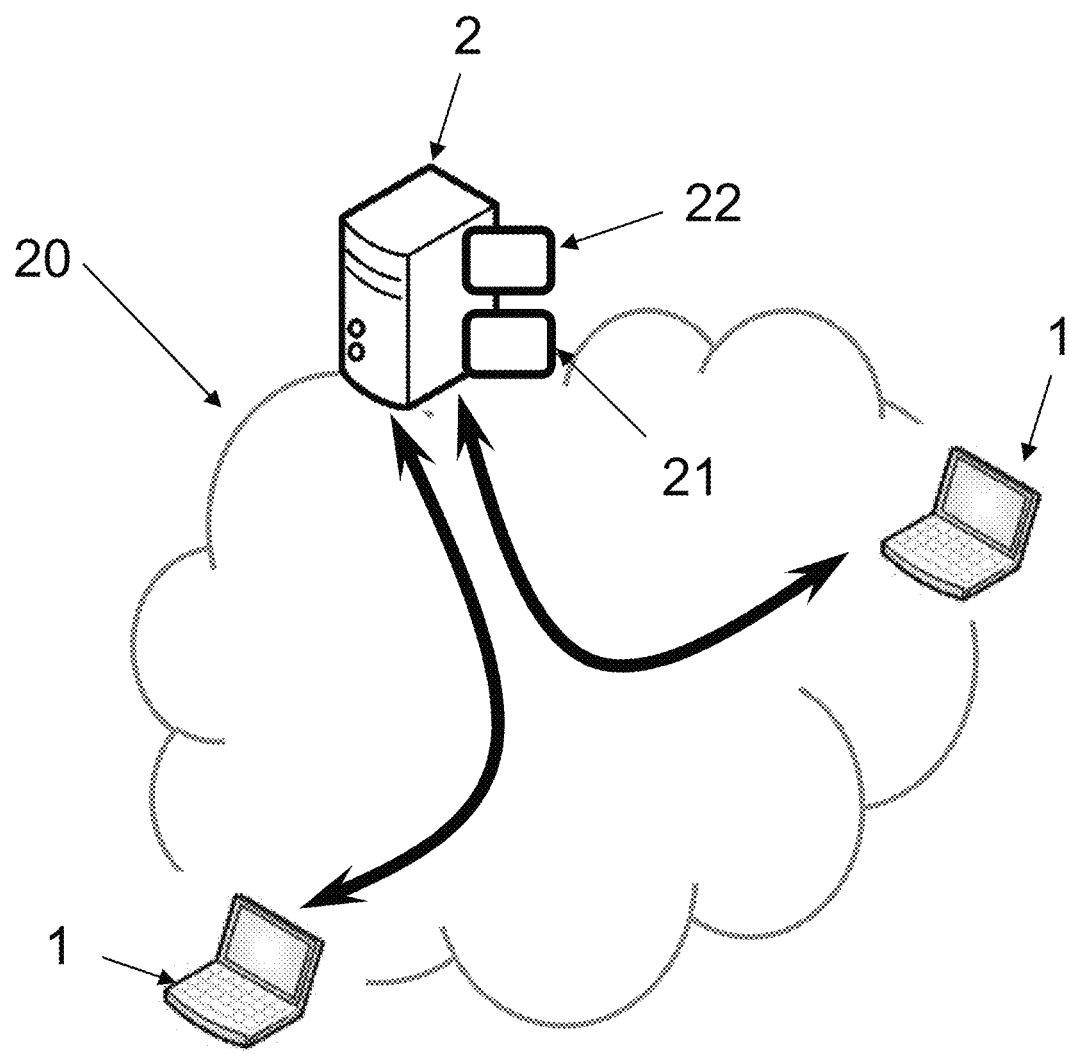
FIG. 1 illustrates an example of architecture in which the method according to the invention is performed.

The present is implemented within an architecture such as illustrated in FIG. 1, wherein clients 1 and a server 2 are connected, in particular through a network 20 such as internet, i.e. the server 2 is a remote server.

The server 2 comprises a processing unit 21 such as a processor, and generally a memory 22. Clients 1 could be any kind of user device, such as a mobile terminal (smartphone, tablet, etc.), a PC (laptop), etc.

The candidate annotations are typically received and collected by the server 2 from clients 1 which are typically computers of annotators. More precisely, the server 2 handles a database of images (yet to be annotated), and images are advantageously first sent to clients 1 for being annotated by the annotators which reply with corresponding candidate annotation. The server 2 associates together the candidate annotation provided by different annotators for the same instance of the same image.

Figure 3A:
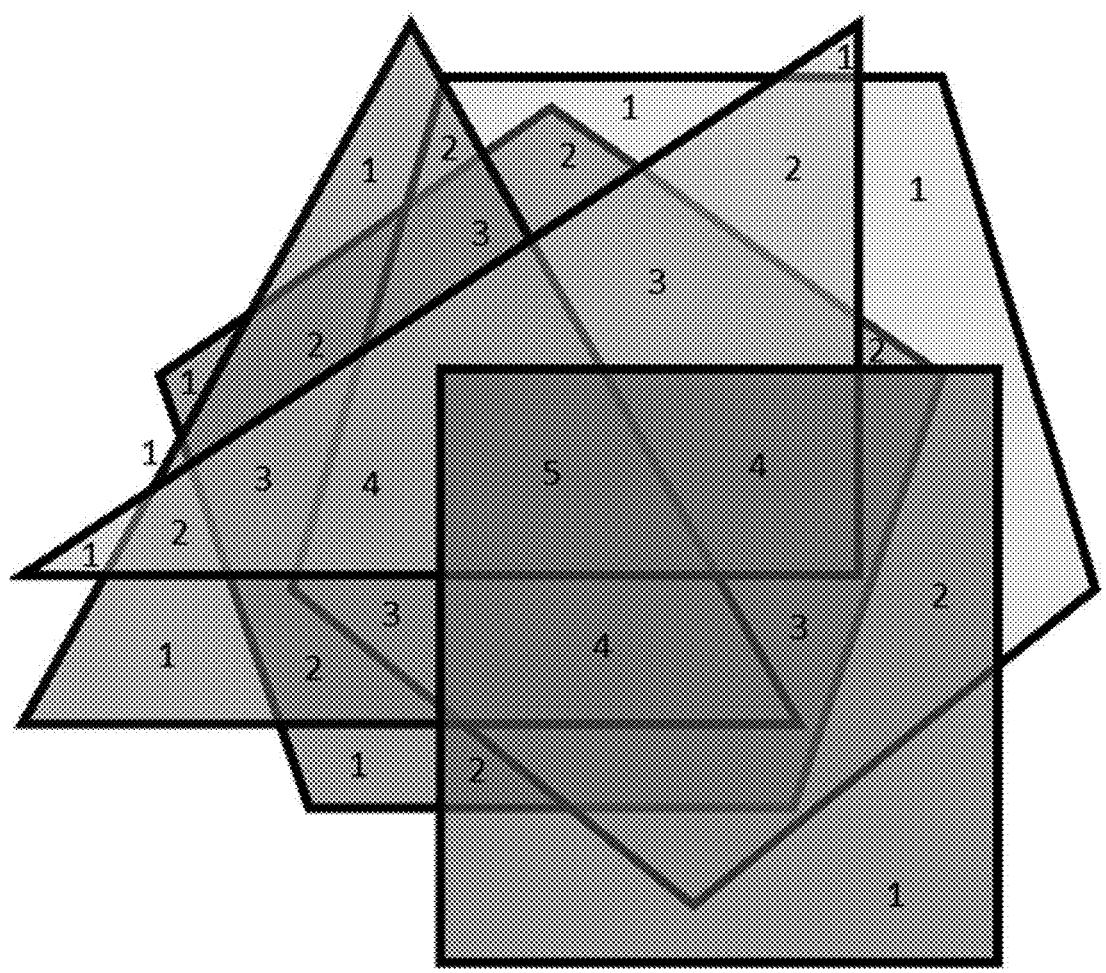
FIG. 3a represents an example of a plurality of candidate annotations.

FIG. 3a represents an example of a set of five candidate annotations (polygonal) received for a given instance. We can see that the polygons are sensibly close, but it is unknown where the instance really is, i.e. which candidate annotation is "good" or "bad".

Method for Processing a Plurality of Candidate Annotations

In the present method, the processing unit 21 of the server 2 processes all the candidate annotations of a given instance of an image for generating a final annotation of said instance. It is reminded that the present method does not use the image as input (only the candidate annotations are used as inputs), i.e. the accuracy of each candidate annotation is not assessed with respect to the instance as depicted by the image, but with respect to other candidate annotations.

Figure 2:
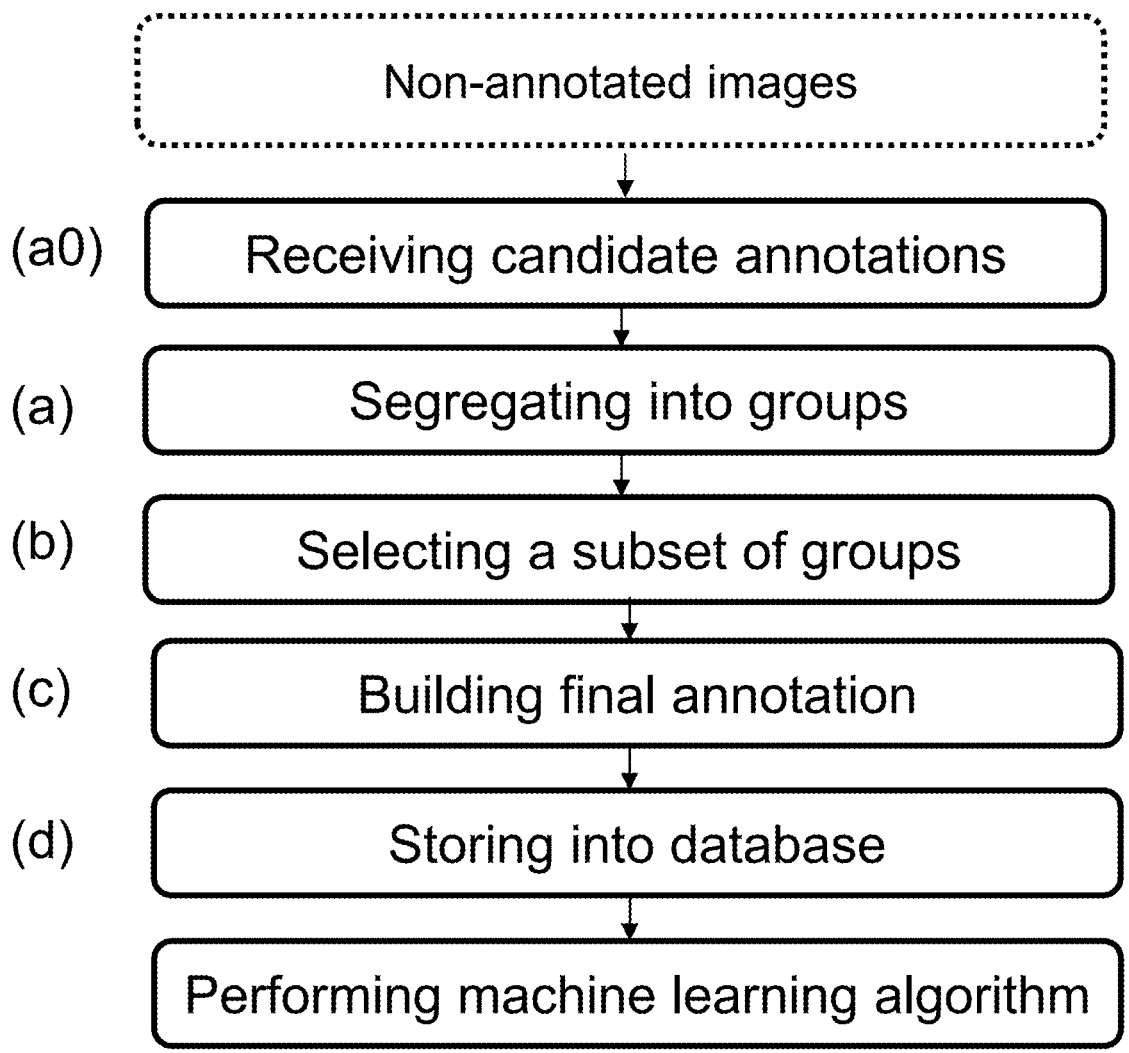
FIG. 2 represents the steps of a preferred embodiment of the method according to the invention.

Referring to FIG. 2, the method starts with a step (a) of segregating said candidate annotations into a set of separate groups of at least overlapping candidate annotations.

In other words, for n candidate annotations Ai with $0 < i \leq n$, each annotation is assigned to one of k groups Gj with $0 \leq j \leq k \leq n$. It is to be understood that the groups define a partition of all candidate annotations, hence the "separate" groups.

The idea is that candidate annotations of a single group are at least overlapping (and in particular are "sufficiently overlapping", criteria for assessing this will be detailed), in other words are located very close, which tends to demonstrate that they are equally reliable.

According to a first embodiment, step (a) is performed such that two candidate annotations grouped together (i.e. assigned to the same group) simply present a non-null intersection.

According to a second embodiment (more restrictive), step (a) is performed such that two candidate annotations grouped together present a Jaccard index above a predetermined threshold and/or are concentric.

By Jacquard index, or Intersection over Union (IoU), is meant the size of the intersection divided by the size of the union of the candidate annotations:

$$J(A1, A2) = \frac{A1 \cap A2}{A1 \cup A2}.$$

A threshold of 50% may be for instance used, or 75% (or even higher) if we want to be more restrictive. Note that if a threshold of 0% is used, it is equivalent to the first embodiment.

By concentric candidate annotations, it is meant that one is entirety included into the other with no intersection points between them, i.e. A1∩A2=A1 and A1∪A2=A2 (if we arbitrarily consider A1 as the one included into A2). Note that two concentric candidate annotation may have a low Jacquard index (if they have very different sizes).

Step (a) is performed by comparing each candidate annotations with other candidate annotations, preferably up to all other candidate annotations (i.e. at worse n(n−1)/2 comparisons), in particular recursively over the candidate annotations (in particular in a random order, but also possibly according to a "trust level" of annotators, etc.). By "comparing", it is meant testing the overlapping criterion presenting above (Jacquard index and/or concentricity).

If step (a) is performed recursively, for initializing, a first candidate annotation A1 is arbitrarily assigned to a first group G1.

Then for each next candidate annotation Ai:
either it is assigned to one existing group Gj,
or a new group is created for this candidate annotation.

More precisely, the algorithm first attempts to assign said next candidate annotation Ai to the first existing group G1 by comparing this candidate annotation Ai with at least one (preferably each) candidate annotation of the first group, i.e. testing the overlapping criterion.

If the criterion is satisfied for all the candidate annotations of the first group with which the comparison has been performed, said next candidate annotation Ai is assigned to the first group. Else the algorithm attempts to assign said next candidate annotation Ai to the second existing group G2, etc. If every existing group has been tested and the candidate annotation Ai cannot be assigned to any of them, a new group is created.

For example, let's assume that are already existing G1={A1, A3} and G2={A2} (i.e. A2 and A3 have already been assigned).

The next candidate annotation A4 is attempted to be assigned to the first group by comparing it to A1 and/or A3 (the candidate annotations of the first group A1). If A4 has a sufficient overlapping with A1 and/or A3, it is assigned to the first group G1, else it is compared with A2. If A4 has a sufficient overlapping with A2, it is assigned to the second group G2, else it is assigned to a newly third group G3.

Note that it is possible that a single group containing each candidate annotation is created, in particular if all annotations are close: in the example of FIG. 3a, a single group may be created if the predetermined Jacquard index threshold is not too high.

Then, in a second step (b), a subset of said groups is selected as a function of the number of candidate annotations in each group. The idea is to eliminate very small groups (containing few candidate annotations) as theses candidate annotations are likely to be false positives (because most of annotators have produced a very different annotation).

This step can be carried in several different ways. For example, the groups can be sorted by the number of candidate annotations they contain and the k' biggest ones (k' being such that 1≤k'≤k, either a predetermined number or a function of k—for instance 20% of k) are selected.

Alternatively, a first number of candidate annotations can be predetermined, in particular defined by a rate noted taoA (the minimum rate of annotators we need to have with correct annotations for the result to be reliable, for example 50% or even 70%), and only groups containing at least taoA*n candidate annotations are selected. Note that again this embodiment may lead to have every group selected, for instance if there is only a single group created.

All the candidate annotations of selected groups (in short the "selected candidate annotations" are pooled again). We note n'≤n the number of selected candidate annotations.

Step (b) may comprise rewarding the annotators whose candidate annotations have been selected and/or punishing the annotators whose candidate annotations have not been selected, for example by modifying a "trust level" of the annotator and/or financial incentive.

In a following step (c), as explained the selected candidate annotations are aggregated into a final annotation of the given instance of said image. The final annotation is here built as a combination of regions of the candidate annotations of said selected groups (the selected candidate annotations) where at least a second predetermined number of the candidate annotations of said selected groups overlap.

Indeed, all the selected candidate annotations can be divided into elementary regions defined by all possible intersections of the selected candidate annotations. Each of these regions belongs to at least one candidate annotation, possibly more. Thus, each of these regions can be associated to the number of candidate annotations overlapping on this region (this number being noted r with 1≤r≤n' for each.

To rephrase that, each pixel of at least one selected candidate annotation can be associated to the number of selected candidate annotations to which this pixel belongs. The "regions" then corresponds to connected spaces of pixels belongings to the same number of selected candidate annotation.

Note that these regions and are visible in the FIG. 3a, along with the numbers r of candidate annotations overlapping on these regions.

Like for step (b) the predetermined number can be either a given value of expressed as a function of a rate noted taoB (Overlap Intensity Factor, which is the minimum rate of overlapping pixels required—such as 70%) and the number of candidate annotations (the initial number n, i.e. the number of annotators, or the number n' of selected candidate annotation, i.e. the second number is taoB*n or taoB*n).

Note that the final annotation is the union of regions overlapping exactly r times with any r comprised between the second predetermined number and n'. The outlying regions are discarded. Thus, to find out the regions overlapping at least r times with n' selected candidate annotations may be used the Combination formulae n'Cr. Indeed, the final annotation of the given instance of said image is mathematically the union of all possible combinations of intersections of the second predetermined number of candidate annotations of said selected groups among all the candidate annotations of said selected groups.

Figure 3B:
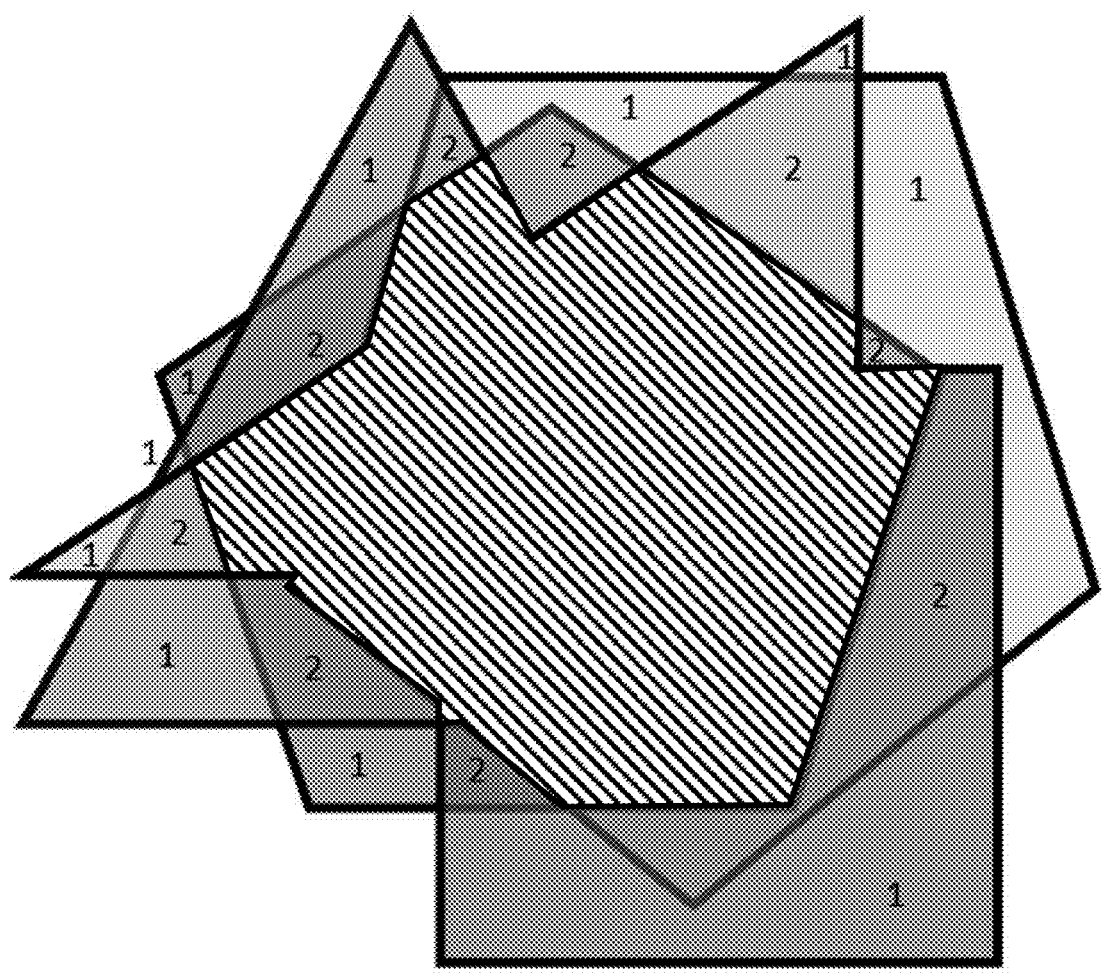

For e.g. the FIG. 3b represents the final annotation if choosing 3 as the predetermined number of overlapping times, i.e. 5C3.

Using the combinatorics, the following relations may be set in the example of 5 selected candidate annotations:
The combinations of regions overlapping at least 1 time=A1∪A2∪A3∪A4∪A5.

The combinations of regions overlapping at least 2 times= $(A1 \cap A2) \cup (A1 \cap A3) \cup (A1 \cap A4) \cup (A1 \cap A5) \cup (A2 \cap A3) \cup (A2 \cap A4) \cap (A2 \cap A5) \cup (A3 \cap A4) \cup (A3 \cap A5) \cup (A4 \cap A5)$.

The combinations of regions overlapping at least 3 times= $(A1 \cap A2 \cap A3) \cup (A1 \cap A2 \cap A4) \cup (A1 \cap A2 \cap A5) \cup (A1 \cap A3 \cap A4) \cup (A1 \cap A3 \cap A5) \cup (A1 \cap A5 \cap A5) \cup (A2 \cap A3 \cap A4) \cup (A2 \cap A3 \cap A5) \cup (A2 \cap A4 \cap A5) \cup (A3 \cap A4 \cap A5)$.

The combinations of regions overlapping at least 4 times= $(A1 \cap A2 \cap A3 \cap A4) \cup (A2 \cap A3 \cap A4 \cap A5) \cup (A3 \cap A4 \cap A5 \cap A1) \cup (A4 \cap A5 \cap A1 \cap A2) \cup (A5 \cap A1 \cap A2 \cap A3)$.

The combinations of regions overlapping at least 5 times=$A1 \cap A2 \cap A3 \cap A4 \cap A5$.

Generation of a Training Database

As already explained, the ultimate goal of the present method is obtaining a training database for machine learning.

Thus, the method advantageously comprises a step (d) of storing (for example in storage unit 22 of the server 2) the image associated with the final annotation in a database (i.e. the image annotated with the final annotation, referred to as "training image").

As it will be explained, there may be several instances in the image (and a plurality of candidate annotations for each of them), and thus steps (a) to (c) are preferably performed for each instance for which there is at least one candidate annotation, so as to build a final annotation for each instance annotated at least once of said image.

In such case, the training image (to be stored in the database) is associated with each final annotation that has been built for an instance of the image.

In a very preferred workflow, is initially available a database of non-annotated images. Each of these "not annotated yet" images has to be annotated for transforming this ordinary database into a training database for machine learning. In such case, the "storage" of the image is simply the association to this image of the final annotation(s). Note that there may alternatively be an "input" database of non-annotated images and an "output" database of annotated images.

In any case, in an advantageous previous step (a0), a non-annotated image (of the database) is transmitted to clients 1 of human annotators (in other words, the image is sent in a "non-annotated state"); and in response, from each client 1 a candidate annotation is received for at least one instance of the image (as explained there is no need to send the image back, for instance just the coordinates and labels of the candidate annotations are sent), so as to get for each instance a collection of the corresponding candidate annotations from various clients, and then to build a final annotation for each instance annotated to at least once of said image.

In other words, for each non-annotated image of the database, one or more final annotations are built, and then associated to the image into the database so as to get a training image.

This may be repeated for a plurality of non-annotated images, and preferably for each non-annotated image of the database (in particular until no non-annotated image are left in the database), so as to generate a training database for machine learning.

Method for Learning Parameters of a Computational Model

In a second aspect, is provided a method for learning parameters of a computational model. Such computation model may be of any known type of artificial intelligence for performing a task on images, such as neural networks, genetic algorithms, support vector machines, k-means, kernel regression and discriminant analysis, etc.

This method generates a training database using the method for processing candidate annotations according to the first aspect as previously described, and then performs a machine learning algorithm (chosen as a function of the type of computational model to be learnt) on said generated training database. Any machine learning algorithms known to the skilled person can be used normally. Note that the machine learning algorithm may be performed directly by the server 2, or by any other equipment connected to the server 2 and having access to the generated training database.

Because of the reliability and accuracy of final annotations built thanks to the invention, the training database of images associated to such final annotations is of better quality, and thus a computational model trained on such training database of image will be more discriminant and more efficient.

Computer Program Product

In a third and fourth aspects, the invention concerns a computer program product comprising code instructions to execute a method (particularly on the data processing unit 11, 21 of the client 1 and/or the server 2) according to the first or the second aspect of the invention for processing a plurality of candidate annotations of a given instance of an image, or for learning parameters of a computational model, and a computer-readable medium (memories 12, 22 of the client 1 and/or the server 2) provided with this computer program product.

The invention claimed is:

1. A method for processing a plurality of candidate annotations of a given instance of an image, each candidate annotation being defined as a closed shape matching the instance, wherein the method comprises performing, by a processing unit (21) of a server (2), steps of:
    (a) segregating said candidate annotations into a set of separate groups, wherein each of the separate group consists of a single candidate annotation or consists of a plurality of overlapping candidate annotations;
    (b) selecting a subset of said groups as a function of a first predetermined number of candidate annotations in each group;
    (c) building a final annotation of the given instance of said image as a combination of regions of the candidate annotations of said selected groups, wherein at least a second predetermined number of the candidate annotations of said selected groups overlap in each of the regions.

2. A method according to claim 1, wherein step (a) comprises successively, for each candidate annotation, either assigning it to an existing group of candidate annotations or creating a new group.

3. A method according to claim 1, wherein two candidate annotations assigned to the same group present a Jaccard index above a predetermined threshold and/or are concentric.

4. A method according to claim 1, wherein the groups selected at step (b) are the groups containing at least a first predetermined number of the candidate annotations.

5. A method according to claim 4, wherein the first and the second predetermined number are respectively defined as a first rate of the number of all candidate annotations, and a second rate of the number of candidate annotations of said selected groups.

6. A method according to claim 1, wherein the closed shape of each candidate annotation is a polygon.

7. A method according to claim 1, wherein the final annotation of the given instance of said image is the union of all possible combinations of intersections of the second predetermined number of candidate annotations of said selected groups among all the candidate annotations of said selected groups.

8. A method according to claim 1, wherein the candidate annotations are received from clients (1) of human annotators.

9. A method according to claim 8, wherein said image is initially non-annotated, and the method comprises a previous step (a0) of transmitting the non-annotated image to the clients (1), and receiving in response from each client (1) a candidate annotation for at least one instance of the image, steps (a) to (c) being performed for each instance for which at least one candidate annotation has been received so as to build a final annotation for each instance annotated at least once of said image.

10. A method according to claim 9, wherein said steps (a), (b), (c) are performed for a plurality of non-annotated images, so as to generate a training database for machine learning.

11. A method for learning parameters of a computational model comprising:

generating a training database using the method of claim 10;

performing a machine learning algorithm on said generated training database.

12. A computer program product stored on a non transitory computer-readable medium and comprising code instructions to execute a method according to claim 11 for learning parameters of a computational model, when said program is executed on a computer.

13. A non transitory computer-readable medium, on which is stored a computer program product comprising code instructions for executing a method according to claim 11 for learning parameters of a computational model.

14. A method according to claim 1, comprising a step (d) of storing the image associated with the final annotation in a database.

15. A computer program product stored on a non transitory computer-readable medium and comprising code instructions to execute a method according to claim 1 for processing a plurality of candidate annotations of a given instance of an image.

16. A non transitory computer-readable medium, on which is stored a computer program product comprising code instructions for executing a method according to claim 1 for processing a plurality of candidate annotations of a given instance of an image.

\* \* \* \* \*